United States Patent
Joseph et al.

(10) Patent No.: US 10,798,464 B1
(45) Date of Patent: Oct. 6, 2020

(54) STREAMING DELIVERY OF CLIENT-EXECUTABLE CODE

(71) Applicant: Amazon Technologies, Inc., Seattle, WA (US)

(72) Inventors: Alan Joseph, Seattle, WA (US); Michael Bowerman, Seattle, WA (US); Vinay Chopra, Bellevue, WA (US); Yibo Fang, Seattle, WA (US); Mohnish Makhija, Seattle, WA (US); Brian Stein, Kent, WA (US); Ali Asghari, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 239 days.

(21) Appl. No.: 15/964,569

(22) Filed: Apr. 27, 2018

(51) Int. Cl.
| | |
|---|---|
| G06F 15/16 | (2006.01) |
| H04N 21/61 | (2011.01) |
| H04L 29/08 | (2006.01) |
| H04L 29/06 | (2006.01) |
| H04N 21/845 | (2011.01) |

(52) U.S. Cl.
CPC ......... *H04N 21/6125* (2013.01); *H04L 65/60* (2013.01); *H04L 67/2842* (2013.01); *H04N 21/845* (2013.01)

(58) Field of Classification Search
CPC ..... H04L 63/0428; H04L 67/10; H04L 67/06; H04L 67/42; H04L 63/0853; H04L 65/4069; G06F 21/10; G06F 3/0481; G06F 21/445; G06F 3/04842; G06F 16/24534
See application file for complete search history.

(56) References Cited

U.S. PATENT DOCUMENTS

| | | |
|---|---|---|
| 6,751,735 B1 | 6/2004 | Schell et al. |
| 7,814,472 B2 | 10/2010 | Atsatt |
| 8,443,043 B2 | 5/2013 | Ogawa |
| 8,949,660 B1 | 2/2015 | Pupius et al. |
| 8,954,732 B1 | 2/2015 | Watsen et al. |
| 9,031,531 B2 | 5/2015 | Miluzzo et al. |
| 9,064,099 B2 | 6/2015 | Horning et al. |
| 9,110,765 B2 | 8/2015 | Bolotnikoff et al. |
| 9,147,086 B1 | 9/2015 | Potlapally et al. |
| 9,189,515 B1 | 11/2015 | Tamilmani et al. |
| 9,471,466 B1 | 10/2016 | Garcia |
| 9,594,512 B1 | 3/2017 | Cao et al. |
| 9,729,524 B1 | 8/2017 | Brandwine et al. |

(Continued)

OTHER PUBLICATIONS

U.S. Appl. No. 15/472,823, filed Mar. 27, 2017, Non-Final Office Action dated Sep. 6, 2019.

(Continued)

*Primary Examiner* — Michael A Keller
*Assistant Examiner* — Thao D Duong
(74) *Attorney, Agent, or Firm* — Thomas | Horstemeyer, LLP

(57) ABSTRACT

Disclosed are various embodiments for streaming of executable code to clients. A bundle of executable code to be executed in a client device is identified. A plurality of segments of the bundle of executable code are requested from a server via a network. Individual segments are independently verified as they are received via the network. Processing of data in a first segment of the plurality of segments is commenced before a second segment of the plurality of segments is received.

20 Claims, 7 Drawing Sheets

(56) References Cited

U.S. PATENT DOCUMENTS

| | | | |
|---|---|---|---|
| 9,886,448 B2 | 2/2018 | Kinkade et al. | |
| 10,078,574 B2 | 9/2018 | Lopian | |
| 10,275,600 B2 | 4/2019 | Wysopal et al. | |
| 10,289,630 B2 | 5/2019 | Catania et al. | |
| 2003/0101150 A1* | 5/2003 | Agnihotri | G06F 16/9535 706/45 |
| 2003/0122871 A1 | 7/2003 | Darlet et al. | |
| 2004/0236943 A1 | 11/2004 | Edwards et al. | |
| 2005/0183072 A1 | 8/2005 | Horning et al. | |
| 2006/0129817 A1 | 6/2006 | Borneman et al. | |
| 2007/0022420 A1 | 1/2007 | Yamamoto et al. | |
| 2008/0005114 A1 | 1/2008 | Li | |
| 2008/0133929 A1 | 6/2008 | Gehrmann et al. | |
| 2010/0017506 A1 | 1/2010 | Fadell | |
| 2010/0031036 A1 | 2/2010 | Chauncey et al. | |
| 2012/0303963 A1 | 11/2012 | Murao et al. | |
| 2012/0311546 A1 | 12/2012 | Fanning et al. | |
| 2014/0040616 A1 | 2/2014 | Barber et al. | |
| 2014/0143647 A1 | 5/2014 | Reshadi et al. | |
| 2014/0304512 A1* | 10/2014 | Kotov | H04L 63/0428 713/171 |
| 2015/0033207 A1 | 1/2015 | Fung et al. | |
| 2015/0039872 A1* | 2/2015 | Jorden | G06F 8/60 713/1 |
| 2015/0199261 A1 | 7/2015 | Paveza et al. | |
| 2015/0229593 A1* | 8/2015 | Parker | H04L 51/08 709/206 |
| 2015/0309813 A1 | 10/2015 | Patel | |
| 2015/0312044 A1 | 10/2015 | Tonegawa | |
| 2015/0317167 A1 | 11/2015 | Zhou et al. | |
| 2015/0365463 A1* | 12/2015 | Quan | H04L 67/06 709/219 |
| 2016/0192188 A1 | 6/2016 | Coulier | |
| 2017/0075686 A1 | 3/2017 | Ko | |
| 2018/0005153 A1 | 1/2018 | Ferguson | |
| 2018/0032420 A1 | 2/2018 | Wadsworth | |
| 2019/0108099 A1* | 4/2019 | Mazumdar | G06F 9/45533 |

OTHER PUBLICATIONS

Cheng et al., Toward arbitrary mapping for debugging visualizations, 4 pages (Year: 2016).

Lopes et al., DéjaVu: a map of code duplicates on GitHub, 28 pages (Year: 2017).

U.S. Appl. No. 15/861,429, filed Jan. 3, 2018, Notice of Allowance dated Oct. 10, 2019.

U.S. Appl. No. 15/861,429, filed Jan. 3, 2018, Non-Final Office Action dated Jun. 25, 2019.

U.S. Appl. No. 15/472,823, filed Mar. 29, 2017, Final Office Action dated Apr. 4, 2019.

U.S. Appl. No. 15/472,823, filed Mar. 29, 2017, Non-Final Office Action dated Sep. 5, 2018.

\* cited by examiner

STREAMING DELIVERY OF CLIENT-EXECUTABLE CODE

BACKGROUND

Web applications and mobile applications may dynamically load executable code via a network. The typical application delivery paradigm involves requesting a file, downloading the file, verifying the downloaded file, and then installing or executing the verified, downloaded file. If the entire application is being downloaded or updated, the process may occur in the background and a user may be informed when the application is ready. If an application uses dynamically loaded executable code, the user may have to wait for the download process to complete for functionality to be enabled in the application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to streaming delivery of client-executable software code over a computer network. Applications may dynamically load large bundles of executable code on a client device in order to perform requested functionality, which may require a lengthy network download. Such bundles may correspond to software libraries or other groupings, where more code may be obtained than is strictly necessary for performing the requested functionality. Once the bundle of executable code is downloaded, the client device processes it and loads it into memory, thereby causing additional delay in performing the requested functionality. In some cases, the processor of the client device may be relatively idle during the network transfer of the bundle of executable code, but the processor is unable to process or load the bundle into memory until the entirety of the bundle is downloaded. For example, receiving the entirety of the bundle may be necessary in order to perform cryptographic verification.

Various embodiments of the present disclosure introduce approaches for dividing a bundle of executable code into segments for streaming delivery to a client device over a network. The segments may be processed and loaded into memory by the client device as they are received. In some cases, execution of the code may begin after one or more of the segments are received but before all of the segments are received. A given bundle of executable code may be divided into different quantities of segments based on conditions at the client device. Also, the segments can be cached and sent to other client devices in response to future requests. In some cases, as the bundle of executable code is updated in response to code changes, only those segments that have changed may be sent to client devices in response to subsequent requests.

As one skilled in the art will appreciate in light of this disclosure, certain embodiments may be capable of achieving certain advantages, including some or all of the following: (1) reducing delay or latency in performing requested functionality in an application, (2) improved utilization of computer hardware resources through segmentation, such as improvements in utilization of processors, memory, data storage space, network bandwidth, and so on, (3) dynamic adaptability to varied client conditions, (4) reduced resource consumption by caching segments for future client requests and sending only those segments that have changed in updated versions, (5) improving security by allowing segments to be verified using signatures, etc.

Figure 1:
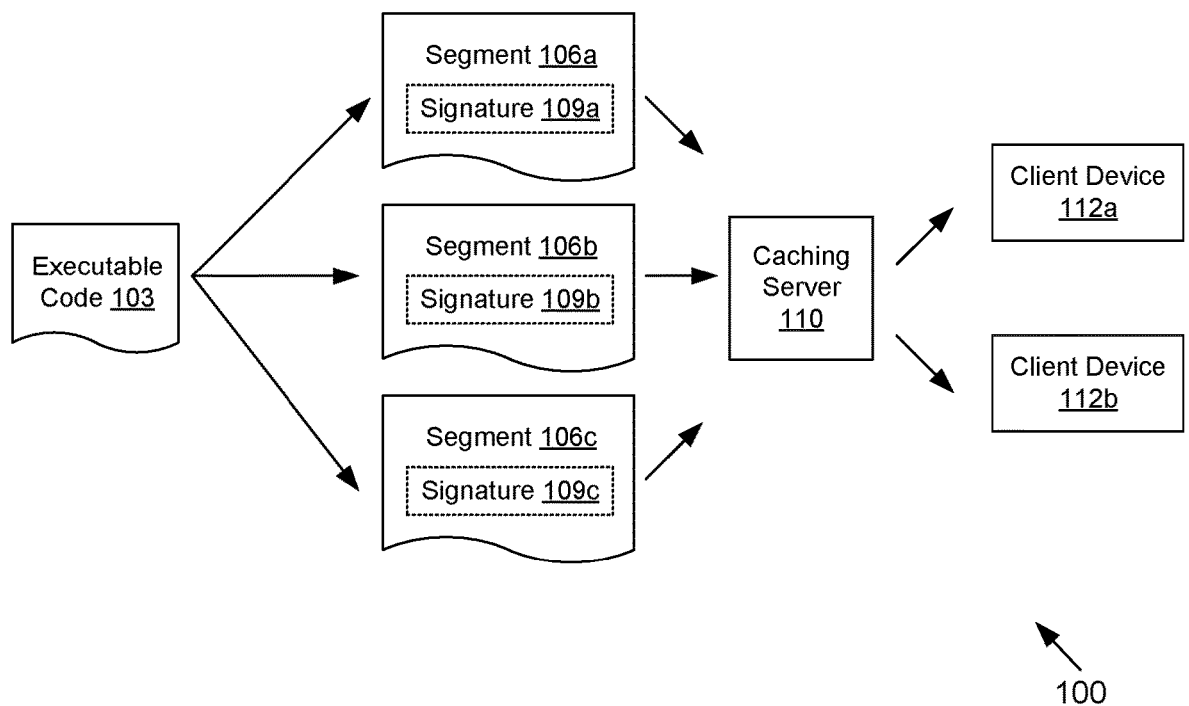
FIG. 1 a drawing of an example scenario of streaming client-executable code according to one or more embodiments of the present disclosure.

With reference to FIG. 1, shown is a drawing of an example scenario 100 of streaming client-executable code according to one or more embodiments of the present disclosure. Executable code 103 is stored in or received by a server. The executable code 103 is divided into a number of segments 106a, 106b, and 106c. Each of the segments 106 is cryptographically signed, with respective signatures 109a, 109b, and 109c being generated along with the corresponding segment 106a, 106b, or 106c. The segments 106 may be sent to a caching server 110, which stores the segments 106. The segments 106 are then sent via a network to multiple client devices 112a and 112b for execution. In the following discussion, a general description of the system and its components is provided, followed by a discussion of the operation of the same.

Figure 2:
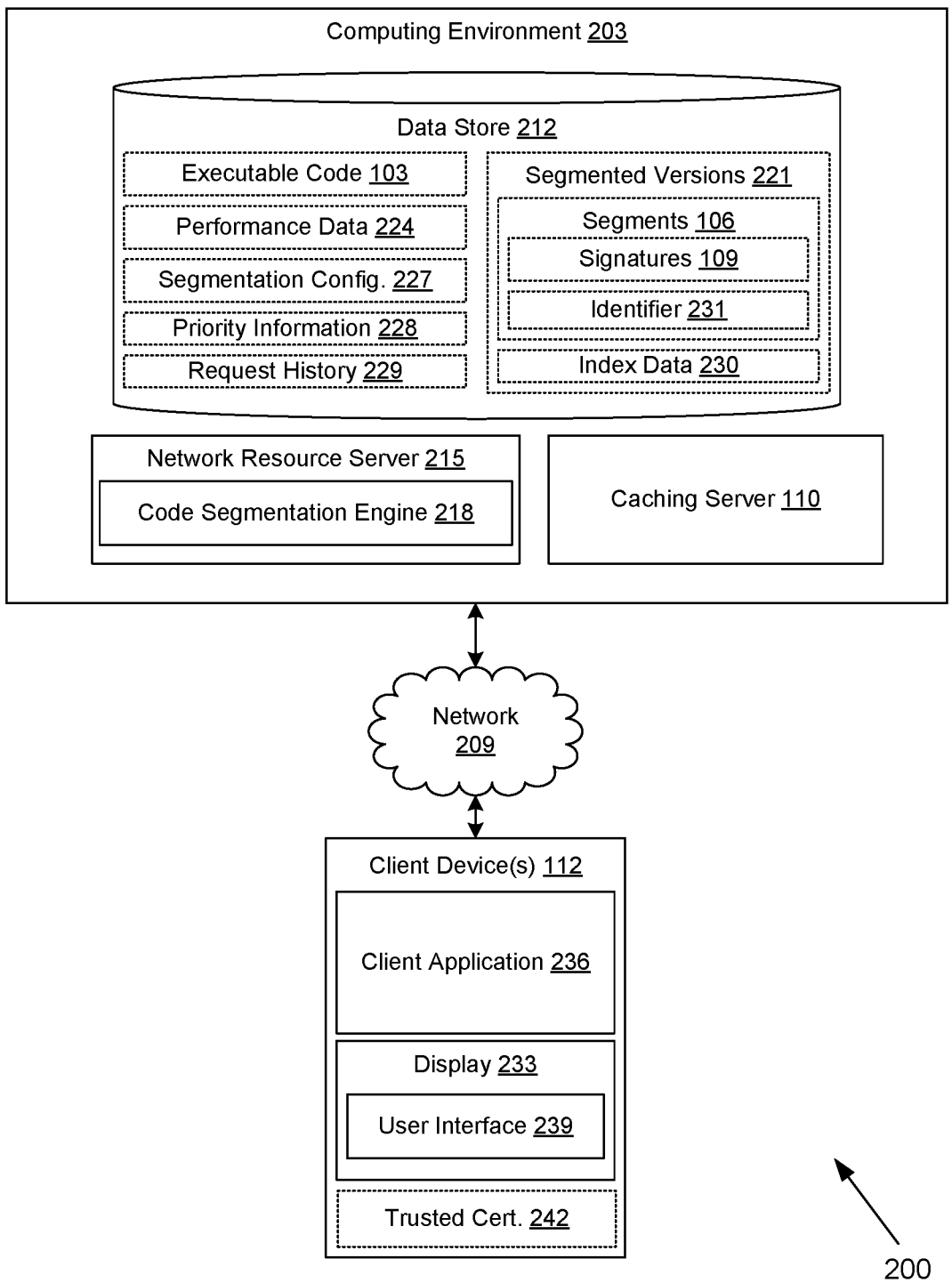
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 112, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a network resource server 215, a code segmentation engine 218, a caching server 110, and other applications, services, processes, systems, engines, or functionality not discussed in detail herein. The network resource server 215 is executed to receive and respond to requests from client devices 112 for network resources, such as executable code 103, images, graphics, video, audio, and network pages, such as web pages or other forms of network content. In responding to requests for executable code 103, the network resource server 215 may employ a code segmentation engine 218 to segment the executable code 103 for streaming to the client device 112 via the network 209.

The caching server 110 may be deployed to cache and distribute the segments 106 to client devices 112 in response to future requests. To this end, the caching server 110 may comprise a content delivery network. In some cases, the caching server 110 may be separate from the computing environment 203 and considered untrusted. However, the data sent by the caching server 110 may be verified through the use of a signature sent with the data as will be described.

The data stored in the data store 212 includes, for example, executable code 103, segmented versions 221 of the executable code 103, performance data 224, segmentation configuration 227, priority information 228, request history 229, and potentially other data. The executable code 103 corresponds to bundles of code that is executable in a client device 112 and is transferred from the computing environment 203 to the client device 112 via the network 209. The executable code 103 may be used as part of a web application, a mobile application, or other types of applications. The executable code 103 may be machine code instructions executable by a processor, interpreted code executable by an interpreter executed by a processor, bytecode executable by a runtime executed on a processor, or other forms of code. Examples of executable code 103 may comprise JAVASCRIPT, JAVA, PYTHON, VBSCRIPT, C++, C #, and/or other code. The executable code 103 may be bundled as a file or a concatenation of multiple files. The executable code 103 may be processed via minification, compression, and/or other forms of processing.

The segmented versions 221 correspond to divisions of the bundles of executable code 103 into one or more segments 106 having respective signatures 109. It is noted that multiple segmented versions 221 may be generated for a single bundle of executable code 103, which represents the division of that bundle of executable code 103 into different numbers of segments 106.

In one embodiment, each segmented version 221 may correspond to a single file or storage resource in the data store 212, where the index data 230 may indicate starting and/or ending offsets in the file or resource. Thus, random access within the file or resource may be provided. Alternatively, the single file or resource may be divided into segments 106 by way of sentinel characters (e.g., a newline character) that indicate either that a segment 106 ends or that another segment 106 begins. In other scenarios, the index data 230 may indicate multiple URLs where each segment 106 is available at a distinct URL. Each segment 106 may be assigned an identifier 231 that uniquely identifies the segment 106. In one embodiment, the identifier 231 may be generated by hashing the content of the segment 106. In some cases, the URL of a segment 106 may include the identifier 231.

The signatures 109 enable verification of the content of the segment 106. In one embodiment, a signature 109 is generated by digitally signing the content with a private key, and a public key to verify that the content was signed by the corresponding private key. In other embodiments, the signatures 109 may include checksums over the content, hash values of the content, or other data to verify the integrity of the content of the segments 106.

The performance data 224 may correspond to metrics from client devices 112 indicating times to obtain or process the segments 106 as they are downloaded via the network 209 and loaded into memory in the client device 112. The performance data 224 may be used to determine numbers of segments 106 that are used for a given set of conditions observable at a client device 112. The segmentation configuration 227 may indicate how the bundles of executable code 103 are divided into segments 106, how many different segmented versions 221 are generated and for which numbers of segments 106, and so on.

The priority information 228 may indicate a priority or priority order for each of the segments 106 within a segmented version 221. In some cases, multiple priority orders may be identified for a segmented version 221 based at least in part on which functions are to be called within the executable code 103. Also, a default order of the segments 106 may be empirically determined based at least in part on a frequency of request priority for particular segments 106 as observed in previous sequences of requests among multiple client devices 112.

The request history 229 may track which segments 106 have been sent to the client device 112 previously and for which the client device 112 still maintains in a cache or data store. Thus, if the client device 112 subsequently requests the same bundle of executable code 103, only those segments 106 that have changed in an updated version, those segments 106 that have not been sent to the client device 112, or those segments 106 which are no longer cached by the client device 112 need to be sent to the client device 112.

The client device 112 is representative of a plurality of client devices 112 that may be coupled to the network 209. The client device 112 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 112 may include a display 233. The display 233 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 112 may be configured to execute various applications such as a client application 236 and/or other applications. The client application 236 may be executed in a client device 112, for example, to access network content served up by the computing environment 203 and/or other servers, thereby rendering a user interface 239 on the display 233. To this end, the client application 236 may comprise, for example, a browser, a dedicated application, etc., and the user interface 239 may comprise a network page, an application screen, etc. The client application 236 may be executed to obtain executable code 103 from the computing environment 203 in one or more segments 106, where the client application 236 may request that the executable code 103 be divided into the segments 106 based at least in part on one or more current conditions at the client device 112. Thus, the client application 236 may be configured to receive the segments 106, verify the segments 106 using the respective signatures 109, and then cause a function in one of the segments 106 to be executed before another segment 106 is received. The client application 236 may have access to a trusted certificate 242 in order to verify a given segment 106 using a corresponding cryptographic signature 109. The client device 112 may be configured to execute applications beyond the client application 236 such as, for example, email applications, social networking applications, word processors, spreadsheets, and/or other applications.

Figure 3:
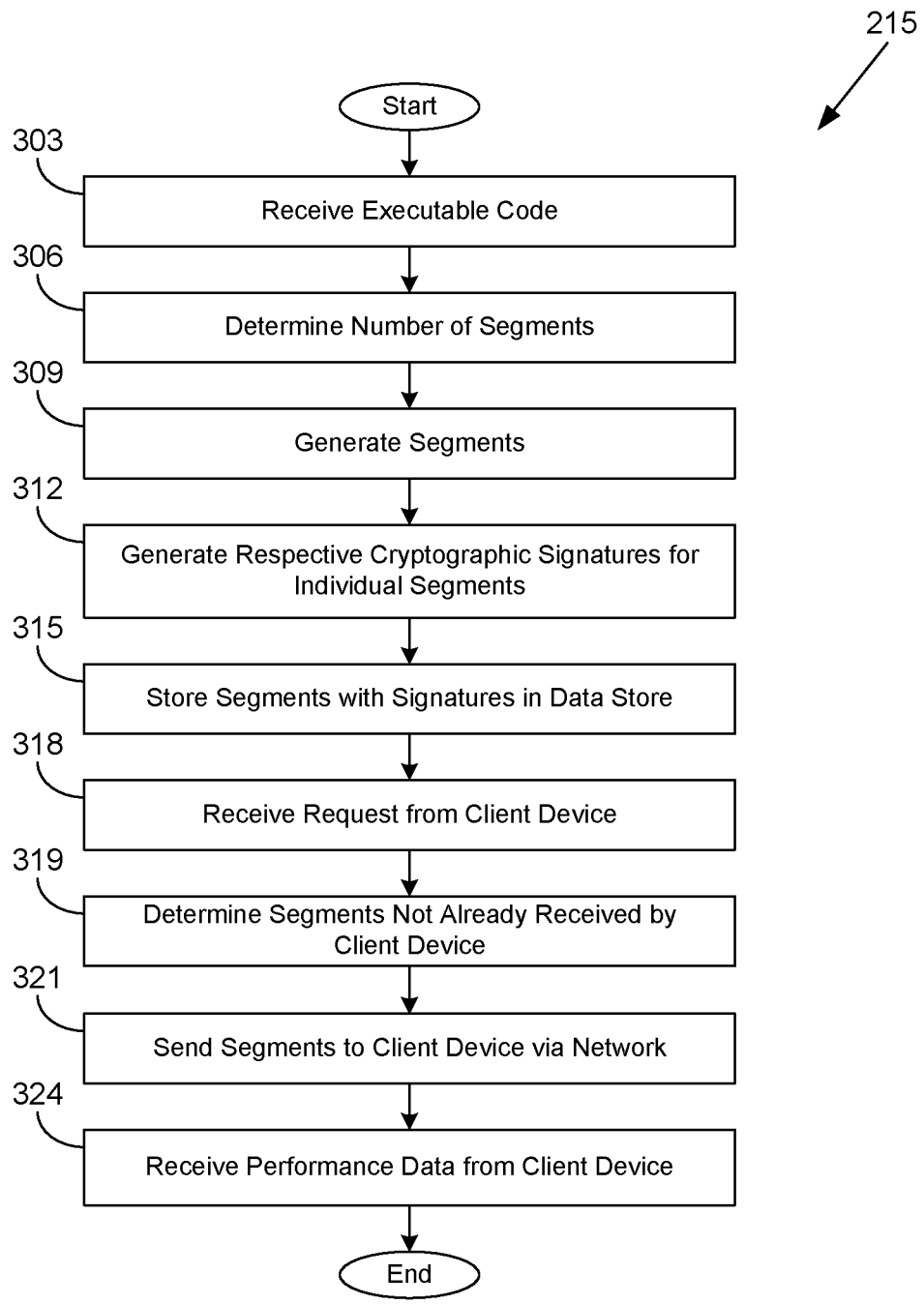
FIGS. 3-5 are flowcharts illustrating examples of functionality implemented as portions of a network resource server executed in a computing environment in the networked environment of FIG. 2 according to various embodiments of the present disclosure.

Referring next to FIG. 3, shown is a flowchart that provides one example of the operation of a portion of the network resource server 215 according to various embodiments. It is understood that the flowchart of FIG. 3 provides merely an example of the many different types of functional arrangements that may be employed to implement the operation of the portion of the network resource server 215 as described herein. As an alternative, the flowchart of FIG. 3 may be viewed as depicting an example of elements of a method implemented in the computing environment 203 (FIG. 2) according to one or more embodiments. One or more portions may correspond to the operation of a code segmentation engine 218 (FIG. 2).

Beginning with box 303, the network resource server 215 receives a bundle of executable code 103 (FIG. 2). For example, the executable code 103 may be uploaded by a developer, downloaded from another server, or retrieved from a data store 212 (FIG. 2). In box 306, the network resource server 215 determines a number of segments 106 (FIG. 2) into which the bundle of executable code 103 is to be divided. The network resource server 215 may generate multiple segmented versions 221 (FIG. 2) of the executable code 103 in advance of requests for the executable code 103 being received from client devices 112 (FIG. 2), where the segmented versions 221 may differ as to the number of segments 106. The number of segments 106 may be determined based upon information sent by a client device 112, conditions determined with respect to the client device 112, a target segment size, segmentation configuration 227 (FIG. 2), and/or other data.

In box 309, the network resource server 215 generates the segments 106 by dividing the executable code 103. The segments 106 may be generated by dividing the executable code 103 evenly. For example, if the bundle of executable code 103 is a 10 megabyte file and four segments 106 are to be generated, the segments 106 may be generated to have 2.5 megabytes each. Nonetheless, the network resource server 215 may generate the segments 106 by dividing the executable code 103 according to natural boundaries, such as syntax elements, function boundaries, class boundaries, object boundaries, file boundaries, and so forth. This can allow the segments 106 to be parsed, loaded into memory, executed, etc. Failure to account for these natural boundaries may result in segments 106 that do not parse or load correctly. Dividing the executable code 103 at these boundaries may result in non-equal segments 106.

In box 312, the network resource server 215 generates respective cryptographic signatures 109 (FIG. 2) individually for each of the segments 106. In box 315, the network resource server 215 may store the segments 106 along with the signatures 109 as segmented versions 221 in the data store 212. In box 318, the network resource server 215 receives a request for a bundle of executable code 103 from a client device 112 via the network 209 (FIG. 2).

In box 319, the network resource server 215 determines the segments 106 that have not already been received by the client device 112 from the request history 229 (FIG. 2). For example, the client device 112 may have already requested and received one or more segments 106 previously. In box 321, the network resource server 215 sends one or more of the segments 106 to the client device 112 via the network 209. These segments 106 may be only those segments 106 that have not previously been sent to the client device 112. The segments 106 may be sent according to a priority order as specified by the priority information 228. Alternatively, segments 106 may be requested by the client device 112 in an order determined by the client device 112. Approaches to sending the segments 106 are described in more detail in connection with the flowcharts of FIGS. 4 and 5.

In box 324, the network resource server 215 receives performance data 224 (FIG. 2) from the client device 112. The performance data 224 may include metrics relating to times to obtain or load the segments 106 in the client device 112. In this regard, it is understood that there may be a performance overhead relating to segmenting the executable code 103 as opposed to transmitting the executable code 103 as a monolithic bundle. The performance data 224 may inform on the appropriate number of segments 106 for a given executable code 103 bundle or an appropriate segment size given conditions present at the client device 112. For example, a faster processor relative to a slower network connection may result in more segmentation as smaller segments 106, when received, may be more quickly loaded by the faster processor. The segmentation configuration 227 (FIG. 2) may be updated based on the performance data 224. Thereafter, the operation of the portion of the network resource server 215 ends.

Figure 4:
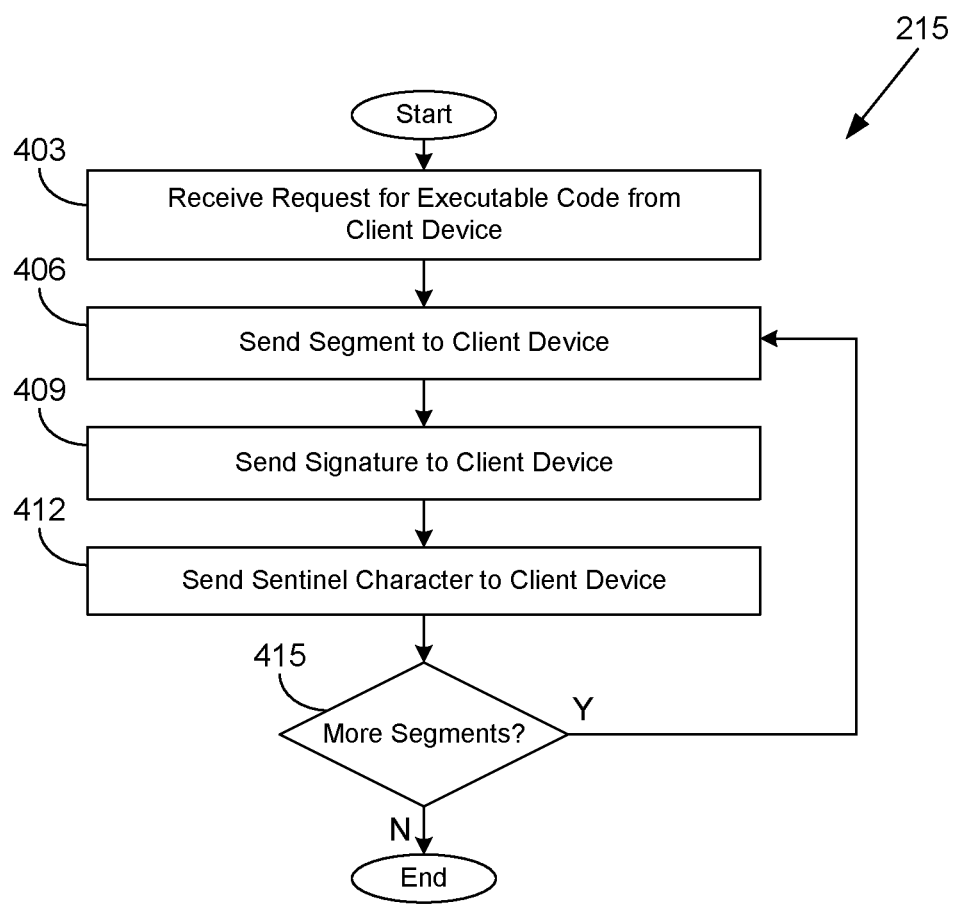

Turning now to FIG. 4, shown is a flowchart that provides one example of the operation of another portion of the network resource server 215 according to various embodiments. It is understood that the flowchart of FIG. 4 provides merely an example of the many different types of functional arrangements that may be employed to implement the operation of the portion of the network resource server 215 as described herein. As an alternative, the flowchart of FIG. 4 may be viewed as depicting an example of elements of a method implemented in the computing environment 203 (FIG. 2) according to one or more embodiments.

Beginning with box 403, the network resource server 215 receives a request for executable code 103 (FIG. 2) by a client device 112 (FIG. 2). For example, the client application 236 (FIG. 2) executed by the client device 112 may request the executable code 103 at a given uniform resource locator (URL). The executable code 103 may be segmented. In some cases, the URL may correspond to a specific segmented version 221 (FIG. 2) of the executable code 103, which has been segmented into a specific number of segments 106 (FIG. 2).

In box 406, the network resource server 215 sends a segment 106 of the executable code 103 to the client device 112 via the network 209 (FIG. 2). The specific segment 106 that is sent may be chosen according to a priority order specified in the priority information 228 (FIG. 2). In box 409, the network resource server 215 sends a signature 109 (FIG. 2) corresponding to the segment 106 to the client device 112 via the network 209. In box 412, the network resource server 215 sends one or more sentinel characters to the client device 112 signaling the completion of the segment 106. In other implementations, the sentinel characters may be sent at the beginning of the segment 106 and also between the segment 106 and the signature 109.

In box 415, the network resource server 215 determines whether more segments 106 remain to be sent. If so, the network resource server 215 returns to box 406 and begins sending the next segment 106 to the client device 112 via the network 209. Otherwise, if no segments 106 remain to be sent, the operation of the portion of the network resource server 215 ends.

Figure 5:
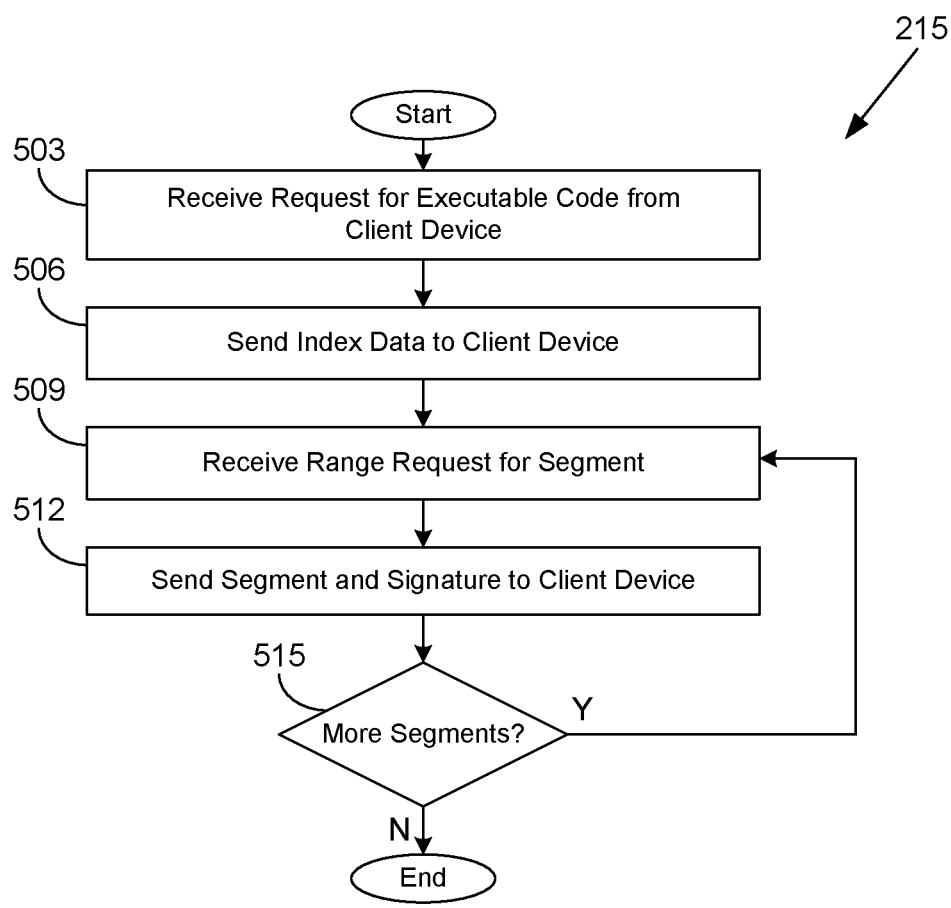

Moving on to FIG. 5, shown is a flowchart that provides one example of the operation of another portion of the network resource server 215 according to various embodiments. It is understood that the flowchart of FIG. 5 provides merely an example of the many different types of functional arrangements that may be employed to implement the operation of the portion of the network resource server 215 as described herein. As an alternative, the flowchart of FIG. 5 may be viewed as depicting an example of elements of a method implemented in the computing environment 203 (FIG. 2) according to one or more embodiments.

Beginning with box 503, the network resource server 215 receives a request for a bundle of executable code 103 (FIG. 2) from a client device 112 (FIG. 2). In box 506, the network resource server 215 sends the index data 230 (FIG. 2) corresponding to a particular segmented version 221 (FIG. 2) of the executable code 103 to the client device 112 via the network 209 (FIG. 2). In box 509, the network resource server 215 receives a hypertext transfer protocol (HTTP) range request for a specific segment 106 (FIG. 2) from the client device 112 via the network 209. The range request may be relative to a particular uniform resource locator (URL) corresponding to a particular segmented version 221. In box 512, the network resource server 215 sends the segment 106 and the respective signature 109 (FIG. 2) to the client device 112 via the network 209 in response to the request.

In box 515, the network resource server 215 determines whether more segments 106 are to be sent in response to range requests. If so, the network resource server 215 returns to box 509 and receives a subsequent range request for a subsequent segment 106. If no more segments 106 remain to be sent, the operation of the portion of the network resource server 215 ends.

Figure 6:
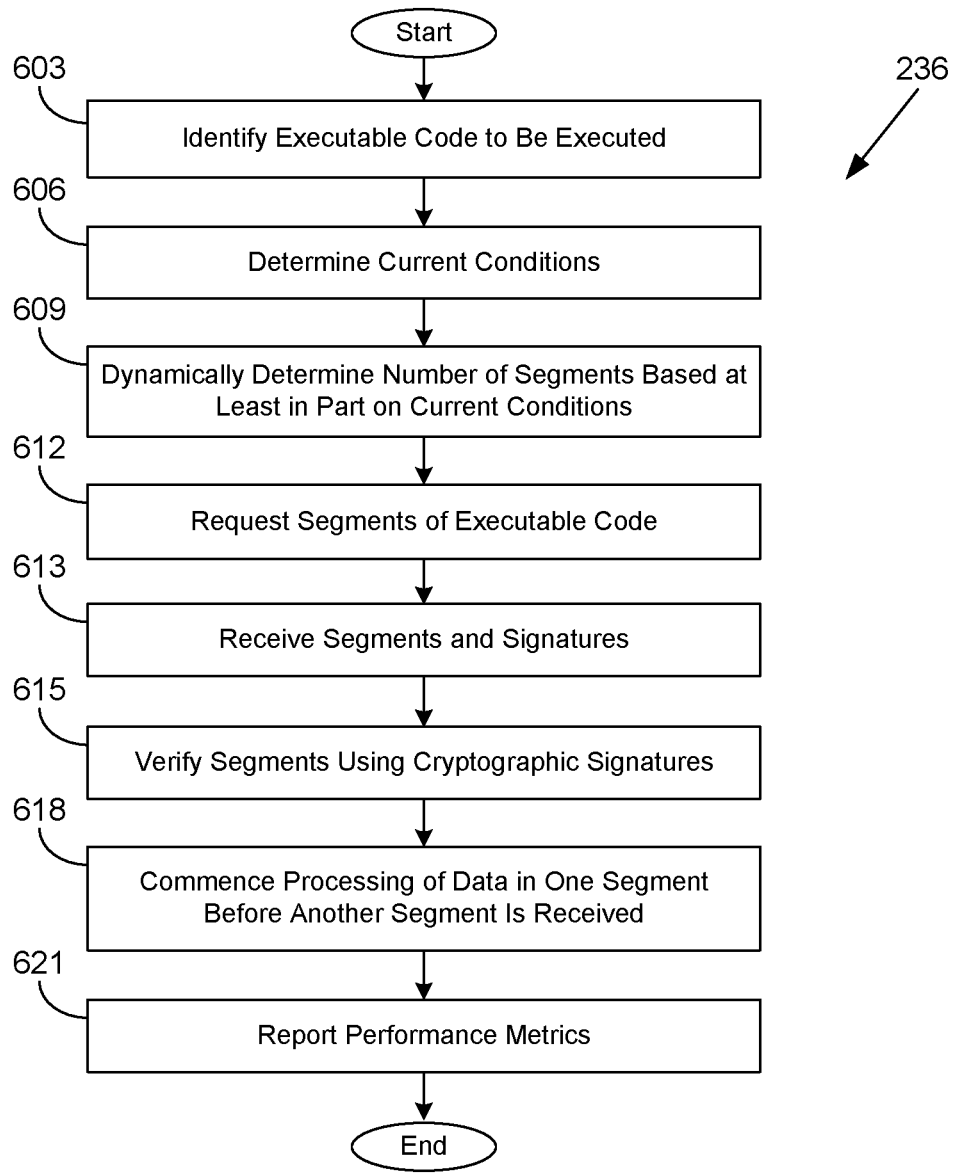
FIG. 6 is a flowchart illustrating one example of functionality implemented as portions of a client application executed in a client device in the networked environment of FIG. 2 according to various embodiments of the present disclosure.

Referring next to FIG. 6, shown is a flowchart that provides one example of the operation of a portion of the client application 236 according to various embodiments. It is understood that the flowchart of FIG. 6 provides merely an example of the many different types of functional arrangements that may be employed to implement the operation of the portion of the client application 236 as described herein. As an alternative, the flowchart of FIG. 6 may be viewed as depicting an example of elements of a method implemented in the client device 112 (FIG. 2) according to one or more embodiments.

Beginning with box 603, the client application 236 identifies a bundle of executable code 103 (FIG. 2) to be executed in the client device 112. For example, a user at a client device 112 may launch a browser or application which is configured to dynamically load client-side code. In box 606, the client application 236 determines current conditions on the client device 112. Such conditions may include available bandwidth, type of network connection (e.g., mobile data, Wi-Fi, Ethernet, etc.), available processor capacity, available memory capacity, available data storage capacity, power source (e.g., on battery or plugged in), type of device (e.g., operating system, model of device), and so on. These conditions may influence whether segmentation of the executable code 103 will provide a performance benefit. The client application 236 may report one or more current conditions to the network resource server 215 (FIG. 2) in a request.

In box 609, the client application 236 dynamically determines the number of segments 106 (FIG. 2) for the executable code 103 based at least in part on the current conditions with respect to the client device 112. The size of the executable code 103 may be a factor, and in some cases, an approximate segment size may be determined rather than a number of segments 106. In other implementations, the network resource server 215 may determine the number of segments 106 based at least in part on the current conditions reported by the client application 236.

In box 612, the client application 236 requests segments 106 of executable code 103 from a network resource server 215 (FIG. 2) via the network 209 (FIG. 2). The request may specify a particular segmented version 221 (FIG. 2), a desired number of segments, or a desired segment size. Alternatively, the request may specify the current conditions relative to the client device 112, and the network resource server 215 may determine a desired number of segments 106 or segment size. The requests may include HTTP range requests based upon index data 230 (FIG. 2) received from the network resource server 215, or the request may simply specify a particular URL, and the streaming data may be separated by sentinel characters.

In box 613, the client application 236 receives the segments 106 and the corresponding cryptographic signatures 109 (FIG. 2) via the network 209 from the network resource server 215. In some cases, the client application 236 may receive the segments 106 in a priority order, which may differ from the actual order within the bundle of executable code 103. In box 615, the client application 236 verifies the segments 106 using the respective cryptographic signatures 109 and a trusted certificate 242 (FIG. 2).

In box 618, the client application 236 commences processing of data in one segment 106 before another segment 106 is received. For example, the client application 236 may commence execution of a function in one segment 106 before another segment 106 is received, or the client application 236 may load data into memory from one segment 106 and decode it before another segment 106 is received. The execution of the function may ultimately use other segments 106, but may be commenced in the absence of the other segment 106, thereby reducing latency and improving performance. Also, other functions in other segments 106 may be executed. However, it is noted that segmentation provides the benefit of avoiding waiting for the receipt of the entire bundle of executable code 103 in order to start loading into memory, processing, and/or executing the segments 106 of executable code 103.

In box 621, the client application 236 may report performance metrics to the network resource server 215 relating to times involved in obtaining and loading the executable code 103. The level of segmentation (i.e., the numbers of segments 106) employed may have a positive or negative impact on performance. Too much segmentation may impose an overhead performance penalty, while lack of segmentation may result in unnecessary latency. The performance metrics may be correlated with the conditions with respect to the client device 112 in order to inform selection of segment size or number of segments 106 for the executable code 103 in future requests by similarly situated client devices 112. The client application 236 may be updated to change the segmentation, and/or the segmentation configuration 227 (FIG. 2) that is server-side may be updated. Thereafter, the operation of the portion of the client application 236 ends.

Figure 7:
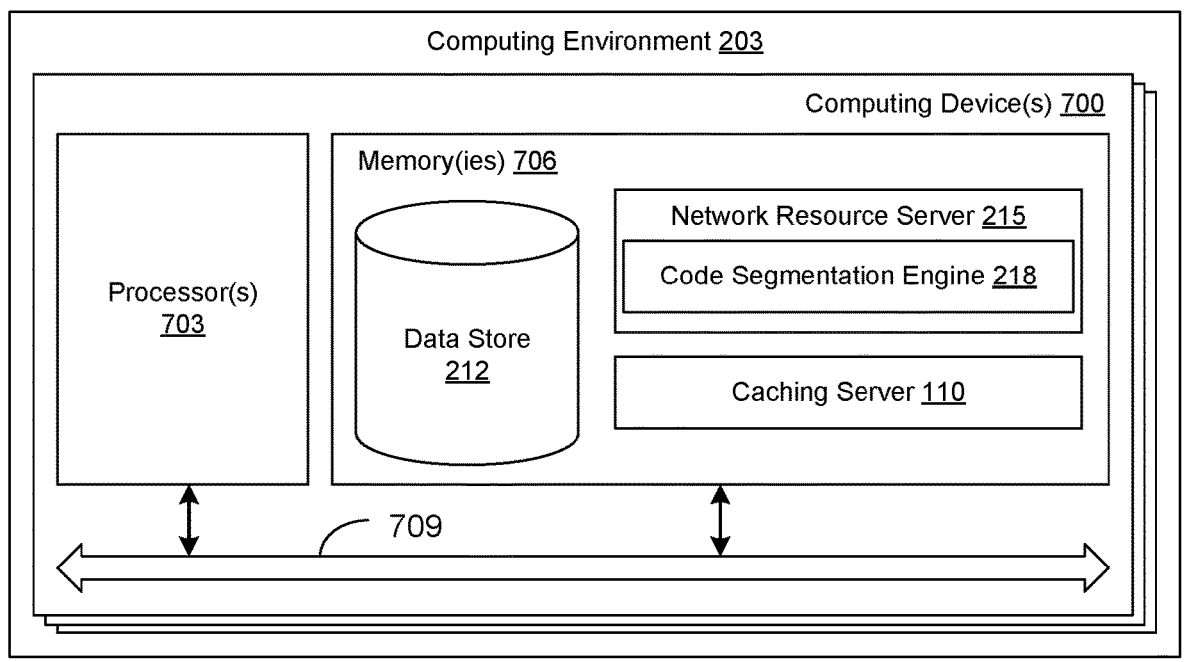
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are a network resource server 215, a code segmentation engine 218, a caching server 110, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the network resource server 215, the code segmentation engine 218, the caching server 110, the client application 236 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the client application 236 and the network resource server 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network resource server 215, the code segmentation engine 218, the caching server 110, and the client application 236, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network resource server 215, the code segmentation engine 218, the caching server 110, and the client application 236, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client device, wherein when executed the program causes the client device to at least:
    identify a bundle of executable code to be executed in the client device;
    determine at least one current condition with respect to the client device;
    request a plurality of segments of the bundle of executable code from a server via a network, wherein the bundle of executable code is divided into a number of segments based at least in part on the at least one current condition of the client device, wherein individual ones of the plurality of segments are requested based at least in part on index data obtained from the server based at least in part on the number of segments and an identification of the bundle of executable code, or the individual ones of the plurality of segments are requested using hypertext transfer protocol (HTTP) range requests relative to a uniform resource locator (URL) of a version of the bundle of executable code corresponding to the number of segments;
    verify the individual ones of the plurality of segments independently as they are received via the network using a trusted certificate stored in the client device and respective cryptographic signatures transmitted with the individual ones of the plurality of segments; and
    commence execution of a function in a first segment of the plurality of segments before a second segment of the plurality of segments is received.

2. The non-transitory computer-readable medium of claim 1, wherein the plurality of segments are requested from a single resource of the server corresponding to the URL.

3. The non-transitory computer-readable medium of claim 1, wherein the server is in communication with a data store that stores a plurality of versions of the bundle of executable code that are divided into different numbers of segments.

4. A system, comprising:
    at least one computing device; and
    an application executable in the at least one computing device, wherein when executed the application causes the at least one computing device to at least:
    identify a bundle of executable code to be executed in the at least one computing device;
    obtain index data from a server via a network based at least in part on a number of segments in a plurality of segments of the bundle of executable code and an identification of the bundle of executable code;
    request the plurality of segments of the bundle of executable code from the server via the network by requesting individual ones of the plurality of segments from the server based at least in part on the index data;
    verify the individual ones of the plurality of segments independently as they are received via the network; and
    commence processing of data in a first segment of the plurality of segments before a second segment of the plurality of segments is received.

5. The system of claim 4, wherein commencing processing of the data in the first segment comprises commencing execution of a function in the first segment before the second segment is received.

6. The system of claim 4, wherein the individual ones of the plurality of segments individually include a respective cryptographic signature for verification using a public key of a trusted certificate.

7. The system of claim 4, wherein the plurality of segments are obtained serially from a single uniform resource locator (URL), and a segmentation of the plurality of segments is indicated by at least one sentinel character.

8. The system of claim 4, wherein when executed the application further causes the at least one computing device to at least dynamically determine the number of segments in the plurality of segments based at least in part on at least one current condition of the at least one computing device, wherein the at least one current condition includes at least one of: a processor utilization, a memory utilization, a data storage utilization, a network bandwidth, a type of client device, a type of network connection, or a power source.

9. The system of claim 4, wherein the individual ones of the plurality of segments are requested from the server according to a priority order.

10. The system of claim 4, wherein when executed the application further causes the at least one computing device to at least report at least one performance metric to the server based at least in part on a time to obtain and process the plurality of segments.

11. A system, comprising:
at least one computing device; and
an application executable in the at least one computing device, wherein when executed the application causes the at least one computing device to at least:
identify a bundle of executable code to be executed in the at least one computing device;
request a plurality of segments of the bundle of executable code from a server via a network by requesting individual ones of the plurality of segments using hypertext transfer protocol (HTTP) range requests relative to a uniform resource locator (URL) of a version of the bundle of executable code corresponding to a number of segments in the plurality of segments;
verify the individual ones of the plurality of segments independently as they are received via the network; and
commence processing of data in a first segment of the plurality of segments before a second segment of the plurality of segments is received.

12. The system of claim 11, wherein when executed the application further causes the at least one computing device to at least dynamically determine the number of segments in the plurality of segments based at least in part on at least one current condition of the at least one computing device, wherein the at least one current condition includes at least one of: a processor utilization, a memory utilization, a data storage utilization, a network bandwidth, a type of client device, a type of network connection, or a power source.

13. A method, comprising:
receiving, via at least one of one or more computing devices, a bundle of executable code to be executed in a client device;
determining, via at least one of the one or more computing devices, a number of segments into which the bundle of executable code is to be divided;
generating, via at least one of the one or more computing devices, a plurality of segments by dividing the bundle of executable code into the number of segments;
generating, via at least one of the one or more computing devices, a respective cryptographic signature for individual ones of the plurality of segments; and
sending, via at least one of the one or more computing devices, the individual ones of the plurality of segments to the client device via a network in response to hypertext transfer protocol (HTTP) range requests relative to a uniform resource locator (URL) of a version of the bundle of executable code corresponding to the number of segments.

14. The method of claim 13, further comprising:
determining, via at least one of the one or more computing devices, a different number of segments into which the bundle of executable code is to be divided; and
generating, via at least one of the one or more computing devices, a different plurality of segments by dividing the bundle of executable code into the different number of segments.

15. The method of claim 13, wherein generating the plurality of segments further comprises dividing, via at least one of the one or more computing devices, the bundle of executable code at one or more function boundaries.

16. The method of claim 13, further comprising assigning, via at least one of the one or more computing devices, a respective priority to the individual ones of the plurality of segments based at least in part on previous sequences of requests for the individual ones of the plurality of segments from a plurality of client devices.

17. The method of claim 13, further comprising:
determining, via at least one of the one or more computing devices, a subset of the plurality of segments that have not been previously sent to the client device; and
sending, via at least one of the one or more computing devices, the subset of the plurality of segments with the respective cryptographic signatures to the client device in response to one or more requests from the client device.

18. The method of claim 13, further comprising storing, via at least one of the one or more computing devices, the plurality of segments with the respective cryptographic signatures in a data store.

19. The method of claim 13, wherein determining the number of segments further comprises dynamically determining, via at least one of the one or more computing devices, the number of segments based at least in part on at least one current condition of the client device reported by the client device.

20. The method of claim 13, wherein determining the number of segments further comprises determining, via at least one of the one or more computing devices, the number of segments before the client device is identified.

* * * * *